(12) United States Patent
Wong et al.

(10) Patent No.: US 11,377,369 B2
(45) Date of Patent: Jul. 5, 2022

(54) MULTI-STAGE WATER FILTRATION SYSTEM

(71) Applicant: Mind Body (Asia) Limited, Hong Kong (HK)

(72) Inventors: Shu Yuen Wong, Hong Kong (HK); Hong Ning Mak, Hong Kong (HK); Siyue Li, Hong Kong (HK); Zihao Chen, Hong Kong (HK); Meng Xu, Hong Kong (HK)

(73) Assignee: Mind Body (Asia) Limited, Hong Kong (HK)

( * ) Notice: Subject to any disclaimer, the term of this patent is extended or adjusted under 35 U.S.C. 154(b) by 103 days.

(21) Appl. No.: 16/826,145

(22) Filed: Mar. 20, 2020

(65) Prior Publication Data

US 2020/0299150 A1 Sep. 24, 2020

Related U.S. Application Data

(60) Provisional application No. 62/822,982, filed on Mar. 24, 2019.

(51) Int. Cl.
*C02F 1/28* (2006.01)
*B01D 69/02* (2006.01)
(Continued)

(52) U.S. Cl.
CPC .............. *C02F 1/28* (2013.01); *B01D 69/02* (2013.01); *B01D 71/34* (2013.01); *C02F 1/44* (2013.01);
(Continued)

(58) Field of Classification Search
None
See application file for complete search history.

(56) References Cited

U.S. PATENT DOCUMENTS 5,236,595 A * 8/1993 Wang ...................... B01J 39/04
210/141
2010/0176044 A1 7/2010 Domb et al.
(Continued)

FOREIGN PATENT DOCUMENTS

CN 2806438 Y * 8/2006
CN 202400912 U * 8/2012
(Continued)

OTHER PUBLICATIONS

Shirin Kiani, Seyed Mahmoud Mousavi, Nasser Shahtahmassebi, Ehsan Saljoughi, Hydrophilicity improvement in polyphenylsulfone nanofibrous filtration membranes through addition of polyethylene glycol, Applied Surface Science, vol. 359, 2015, pp. 252-258 (Year: 2015).*

(Continued)

*Primary Examiner* — Magali P Slawski
*Assistant Examiner* — Eric J McCullough
(74) *Attorney, Agent, or Firm* — Idea Intellectual Limited; Margaret A. Burke; Sam T. Yip

(57) ABSTRACT

The invention provides a water filtration system for removing heavy metals, residual chlorine, estrogens, bacteria and dust from tap water. The system includes a first adsorbent stage cartridge including approximately 40-65 wt. % of silver-impregnated activated carbon, approximately 1-10 wt. % of activated alumina, approximately 15-35 wt. % of ceramic balls, approximately 0.5-1 wt. % of chitosan and approximately 0.5-1 wt. % of kinetic degradation fluxion media. The second filtration stage cartridge includes an antifouling electrospun nanofiber membrane. A flow path is provided between the first adsorbent stage cartridge and the second filtration stage cartridge. The multiple stage water filtration system is capable of filtering water at a volume rate of at least approximately 2 liters per minute. In one embodi- (Continued)

ment, the nanofibers may be polyvinylidene fluoride doped with polyacrylonitrile and including bacteria-repellent methoxy polyethylene glycol side chains such that the nanofiber membrane has a water contact angle of approximately 55 degrees or less.

15 Claims, 6 Drawing Sheets

(51) Int. Cl.
  *B01D 71/34* (2006.01)
  *C02F 1/44* (2006.01)
  *C02F 101/10* (2006.01)
  *C02F 101/14* (2006.01)
  *C02F 101/16* (2006.01)
  *C02F 101/20* (2006.01)
  *C02F 101/22* (2006.01)
(52) U.S. Cl.
  CPC .............. *C02F 1/281* (2013.01); *C02F 1/283* (2013.01); *C02F 1/286* (2013.01); *C02F 1/288* (2013.01); *C02F 2101/103* (2013.01); *C02F 2101/14* (2013.01); *C02F 2101/163* (2013.01); *C02F 2101/20* (2013.01); *C02F 2101/22* (2013.01); *C02F 2209/10* (2013.01); *C02F 2303/04* (2013.01)

(56) References Cited

U.S. PATENT DOCUMENTS

| | | | |
|---|---|---|---|
| 2011/0174158 A1* | 7/2011 | Walls | B01D 39/1623 |
| | | | 96/60 |
| 2011/0297609 A1* | 12/2011 | Hu | B01J 20/2804 |
| | | | 210/259 |
| 2017/0239600 A1 | 8/2017 | Chen et al. | |
| 2018/0053508 A1* | 2/2018 | Agnew | A61M 21/02 |
| 2018/0154310 A1* | 6/2018 | Huang | B01D 61/025 |

FOREIGN PATENT DOCUMENTS

| | | | |
|---|---|---|---|
| CN | 105036378 A | * | 11/2015 |
| JP | H0775777 A | | 3/1995 |
| KR | 200390280 Y1 | | 7/2005 |
| KR | 100536638 B1 | | 12/2005 |

OTHER PUBLICATIONS

Fatma Yalcinkaya, Baturalp Yalcinkaya, Adam Pazourek, Jana Mullerova, Martin Stuchlik, Jiri Maryska, "Surface Modification of Electrospun PVDF/PAN Nanofibrous Layers by Low Vacuum Plasma Treatment", International Journal of Polymer Science, vol. 2016, Article ID 4671658, 9 pages, 2016. (Year: 2016).*
European search report of corresponding European Patent Application No. 20165002.5 dated Aug. 5, 2020.

* cited by examiner

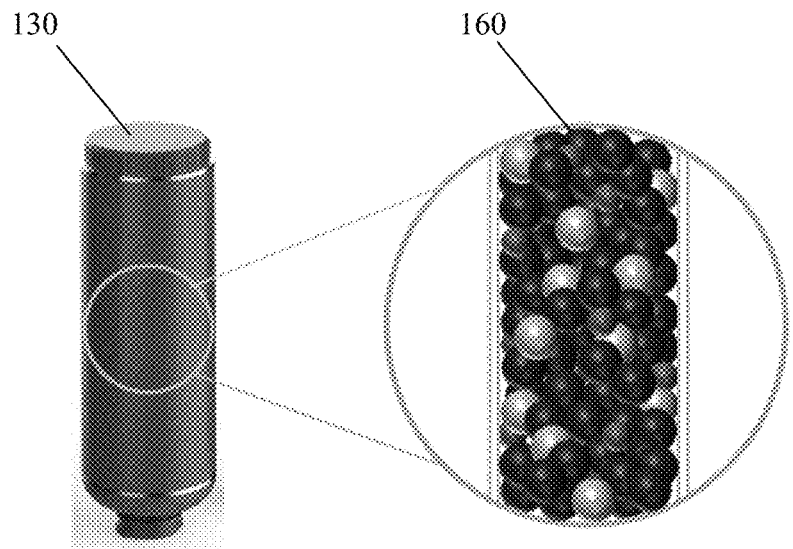
FIG. 2
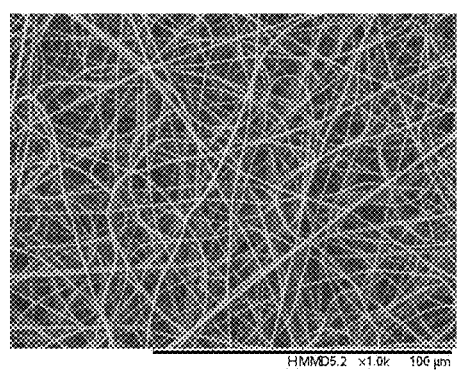 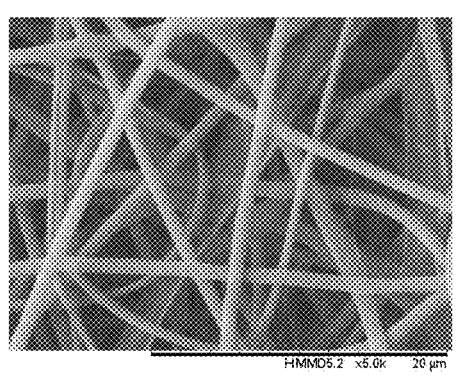
FIG. 3A              FIG. 3B

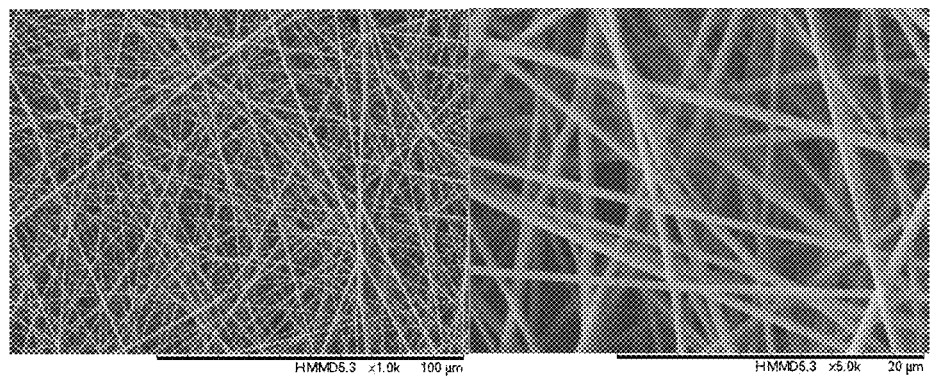
FIG. 4A                    FIG. 4B
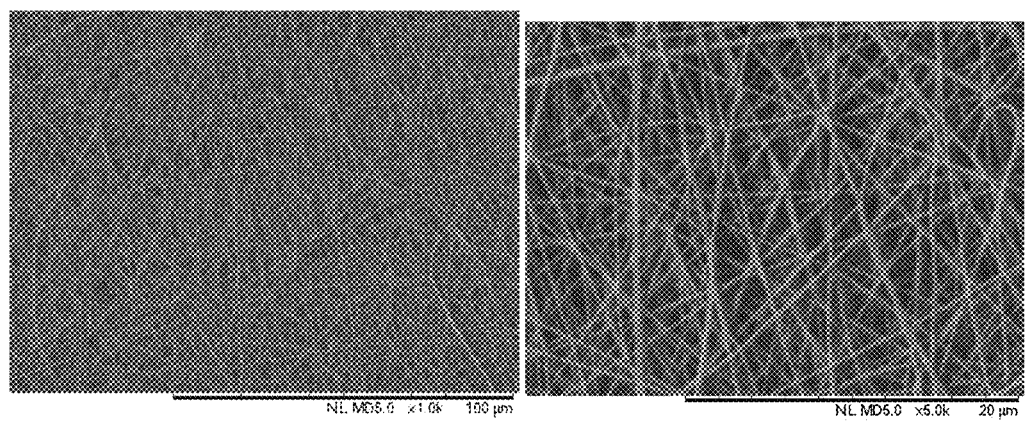
FIG. 5A                    FIG. 5B

MULTI-STAGE WATER FILTRATION SYSTEM

CROSS-REFERENCE TO RELATED APPLICATIONS

This application claims priority from the U.S. Provisional Patent Application No. 62/822,982 filed Mar. 24, 2019, and the disclosure of which is incorporated herein by reference in its entirety.

FIELD OF THE INVENTION

The present invention relates to improved water filtration systems for tap water and, more particularly, to multiple stage water filtration systems with replaceable cartridges and water quality monitoring features.

BACKGROUND

Safe drinking water is vital to human health. However, due to increased discharge of toxic substances to the environment from industrial waste, water supply sources are often contaminated. Even after treatment from municipal water plants, household tap water may include undesirable and/or harmful contaminants, odors, and tastes that prompt consumers to seek ways to improve their tap water quality. As a result, water filtration for household tap water has become increasingly popular. Conventional water filtration media often relies upon carbon particles or shaped carbon blocks to trap contaminants as the water flows through the filtration media.

However, conventional filtration media often becomes clogged with particles, limiting the volume of water that can flow through the media. The flow of water can also degrade the filter media. The user is typically unaware of when the filter media requires changing. Rudimentary flow meters determine that a filter should be changed solely on the basis of the quantity of water that has passed through the filter media, not based on any measure of output water quality.

Membrane filters have also been used for tap water filtration systems. Membrane filters may be used to filter out various particulates and bacteria. However, conventional membrane filters are not readily wet by the tap water they are filtering; in general water contact angles are greater than 140 degrees (that is, the water tends to bead up on the membrane surface). Further, prior art membranes are readily fouled by a variety of pollutants, particularly biofoulants such as bacteria. The adherence of biofoulants to prior art membranes significantly impedes their use in water filtration systems.

Due to the insufficiency of these filtration systems, reverse osmosis (RO) has been used to filter water contaminants. In RO, pressure is used to force water molecules through a semipermeable membrane. RO water filters are believed to offer the highest performance in providing clean drinking water, as they have very high rejection of ionic solutes. However, RO water dispensers suffer from low filtration rate, high water rejection rate and bulky size due to the requirements of a water tank and pump. Therefore, a more eco-friendly, effective and efficient water dispenser is required in the market.

Thus, there is a need in the art for improved water filtration systems that can capture heavy metals, bacteria, and chlorine. There is a further need in the art for improved water filtration systems that can determine when it is time for filtration media to be changed, based on actual water quality levels rather than total volume of water that has been filtered.

SUMMARY OF THE INVENTION

The invention provides a water filtration system with highly efficient water filter cartridges including one adsorbent cartridge and one membrane cartridge. The system can effectively remove heavy metals, residual chlorine, estrogens, bacteria and dust from tap water and provide safe drinking water.

The system includes a first adsorbent stage cartridge including approximately 40-65 wt. % of silver-impregnated activated carbon, approximately 1-10 wt. % of activated alumina, approximately 15-35 wt. % of ceramic balls, approximately 0.5-1 wt. % of chitosan and approximately 0.5-1 wt. % of kinetic degradation fluxion media (a copper and zinc-based filtration media).

The second filtration stage cartridge includes an antifouling electrospun nanofiber membrane, the nanofibers having a diameter typically less than 1 micron with a range of approximately 100 nanometers to 1 micron. More particularly, fiber sizes from 200-600 nm may be used. A flow path is provided between the first adsorbent stage cartridge and the second filtration stage cartridge. The multiple stage water filtration system is capable of filtering water at a volume rate of at least approximately 2 liters per minute.

In one embodiment, the nanofibers are a polyvinylidene fluoride base material doped with polyacrylonitrile and bacteria-repellent methoxy polyethylene glycol side chains such that the nanofiber membrane has a water contact angle of approximately 55 degrees or less.

The nanofiber filtration membrane may be fabricated from a solution of 5-15 wt. % of polyvinylidene fluoride (PVDF) in dimethylformamide (DMF), dimethylacetamide (DMAc), acetone and tetrahydrofuran (THF) solutions respectively by electro-spinning; the thickness of nanofiber layer is approximately 5-40 μm. The surface properties of the nanofibers may be modified by including 0.1-1.0 wt. % of polyacrylonitrile (PAN) and 0.01-0.1 wt. % of lithium chloride (LiCl) to the PVDF solution. An anti-fouling function may be successfully integrated to the nanofibers by introducing 0.1-5 wt. % of methoxypolyethylene glycol (mPEG). The molecular attachment of bacteria-repellent side chain ensures high water flux and large capacity of the filter.

The third aspect of this invention relates to the sequential use of adsorbent media cartridge and membrane cartridge. The adsorbent cartridge removes heavy metals, residual chlorine and estrone; while the membrane cartridge removes bacteria and reduces the turbidity. The water treatment cartridges pass tests according to NSF/ANSI 42 and NSF/ANSI 53 for a capacity of 6,000 liters.

In a further aspect of the invention, the water filtration system may include one or more TDS sensors and a total volume counter. A mobile application monitors the water quality and the use of water from the sensors and counter. Notification may be sent to user's mobile phone when the filter cartridges needs to be replaced.

BRIEF DESCRIPTION OF THE DRAWINGS

FIG. 2 depicts a cartridge of the water filtration system of FIG. 1.

FIGS. 3A-3B depict electrospun nanofibers for use in the water filtration system of FIG. 1.

FIGS. 4A-4B depict electrospun nanofibers for use in the water filtration system of FIG. 1.

FIGS. 5A-5B depict electrospun nanofibers for use in the water filtration system of FIG. 1.

DETAILED DESCRIPTION

Figure 1A:
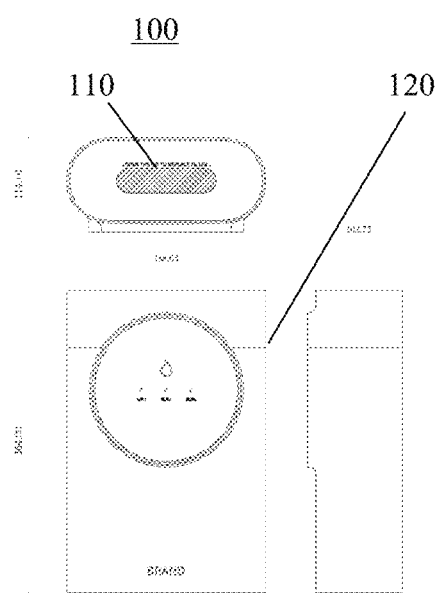
FIG. 1A-1B schematically depict a water filtration system according to an embodiment of the present invention.
Figure 1B:
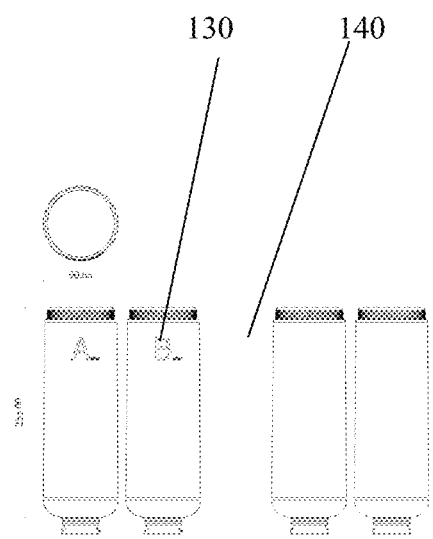

Turning to the drawings in detail, FIGS. 1A-1B depict a water filtration system 100 according to an embodiment of the present invention. In the embodiment of FIG. 1, the water filtration system 100 includes at least two cartridges, cartridges 130 and 140, that are two stages of the water filtration system. The cartridges may be positioned within a housing 110; optionally, as will be discussed in further detail below, the housing 110 may include an indicator region 120 which may include status indicators concerning water quality and the need to change one or more filter cartridges. Although not shown in FIGS. 1A-1B, the water filtration system 100 may include adapters to allow the system to be positioned at the output of a household water tap; this may include a diverter valve to allow the user to select between filtered and unfiltered water. Alternatively, the water filtration system 100 may be installed in a water line upstream of a water faucet—for example in an "under sink" installation. When installed under the sink, the water filtration system of 100 may be made larger with a higher filtration capacity. In such an embodiment, the water filtration system may supply a separate filtered-water tap or may be in the water line for the main tap.

The two-stage water filtration system 100 of FIGS. 1A-1B includes a first stage optimized to remove trace heavy metals, residual chlorine, and pharmaceuticals such as estrogens etc. The second stage is optimized to remove bacteria, rusts and small particles, significantly reducing water turbidity.

FIG. 2 schematically depicts a first stage cartridge, 130. In the first stage, adsorbent media 160 is included, in loose, particulate form. The adsorbent media includes approximately 40-65 wt. % of silver-impregnated activated carbon, approximately 1-10 wt. % of activated alumina, approximately 15-35 wt. % of ceramic balls, approximately 0.5-1 wt. % of chitosan and approximately 0.5-1 wt. % of kinetic degradation fluxion media. The materials may be mixed together as separate components, or one or more components may be mixed with each other and formed into particles. Optionally, all of the media may be combined and formed into a porous shaped solid with a binder phase.

FIGS. 3A-3B depict a membrane of the second stage filter cartridge. The membrane is a non-woven mat of nanofibers. In one embodiment, the non-woven mat of nanofibers may be an electrospun mat of nanofibers formed on a substrate. The substrate may itself be a mat of non-woven fabric such as a mat of polyethylene terephthalate (PET). The electrospun nanofibers may be polyvinylidene fluoride (PVDF) nanofibers. As will be discussed in further detail in the examples below, to enhance the wetting angle of the PVDF fibers and increase the antifouling capacity of the membrane, the PVDF fibers may be doped with a small amount of a wetting-enhancing dopant. The dopant may be polyacrylonitrile (PAN). To enhance the ability of the membrane to repel bacteria, methoxy polyethylene glycol side chains may further be introduced to the fibers. The nanofibers of the membrane are engineered such that the water contact angle is approximately 55 degrees or less (water contact angle and wetting angle are used interchangeably herein as water contact angle is a measure of wettability).

The electrospinning technique used to form the PVDF-based nanofibers creates the desirable filtration properties of the cartridge material. In one embodiment, the electrospinning technique is from a precursor solution including 5-15 wt. % PVDF, 0.1-1.0 wt. % of PAN and 0.01-0.1 wt. % of lithium chloride (LiCl) in a dimethylformamide (DMF) solution. When enhanced antifouling properties are desired, the electrospinning solution further includes 0.1-5 wt. % of methoxypolyethylene glycol (mPEG).

With the combination of the two cartridges, the two-stage water filtration system 100 removes pollutants in tap water can be removed up to 99.99% at a flow rate of at least approximately 2.0 L/min with a filtration capacity of at least approximately 6,000 liters of water.

Figure 9:
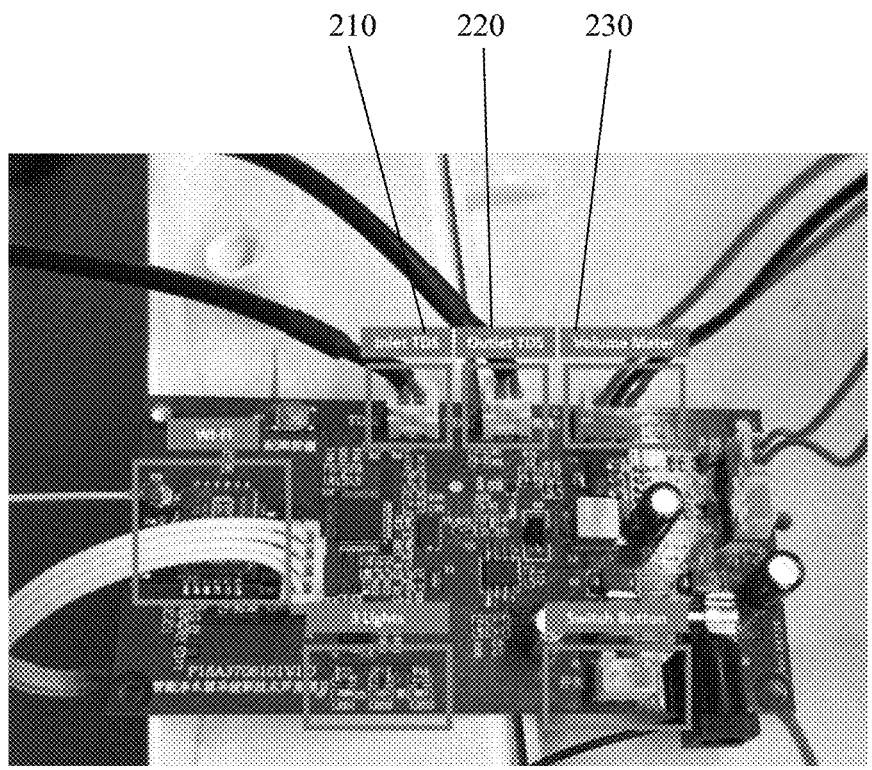
FIG. 9 depicts a printed circuit board for a TDS sensor for the water filtrations system of FIG. 1.

Water quality is significantly variable in different geographic regions; even within the same household, the water quality may vary considerably throughout different seasons of the year (e.g., rainy season vs. dry season). As a result, volume sensors to indicate that cartridge media need to be replaced are inadequate to ensure water quality. For example, water with a higher quantity of pollutants may require more frequent replacement of filtering media. Similarly, water with low levels of pollutants may require considerably less frequent replacement of filtering media. To this end, the water filtration system of the present invention may optionally incorporate a total dissolved solids (TDS) sensor and, optionally, a total volume counter. An exemplary circuit board including an inlet TDS 210, an output TDS 220, and a volume meter 230 is depicted in FIG. 9.

The total dissolved solids are the combined inorganic and organic impurities in a water supply. These solids may be in dissolved form (molecular or ionized) or suspended in the water. A TDS meter measures an electrical charge generated by these impurities; the charge is measured between a pair of electrodes immersed in water. If there are no soluble materials in the water, the water will not indicate a charge and the impurity content will be zero parts per million (0 ppm). When various substances are present in the water the conductivity increases and this increase in conductivity can be converted into a parts per million figure for impurities.

The TDS meter readings may be shown on the display region 120 of the water filtration system 100. However, a raw number indicating an impurity content may not provide enough information to the user regarding whether the output water is safe to drink or whether it is time to change one or more of the filter cartridges. To this end, the TDS meter readings may optionally be sent to an external data processing device such as a computer or mobile phone. The data processing device may include an application that relates the TDS meter readings, either individually or historically, to the need to change the filtration media. The raw TDS number in ppm may be displayed and, based on historical readings, the calculated remaining lifetime of the filter cartridges may be displayed. The use may be notified that it is time to replace the filter cartridges when the TDS readings consistently fall below a predetermined level.

EXAMPLES

Example 1 Adsorbent Cartridge 40-65 wt. % of silver-impregnated activated carbon, 1-10 wt. % of activated alumina, 15-35 wt. % of ceramic balls, 0.5-1 wt. % of chitosan and 0.5-1 wt. % of KDF 55 were well mixed before packing into the cartridge. FIG. 2 schematically depicts the well mixed adsorbent media in the adsorbent cartridge.

Example 2 PVDF Nanofiber Membrane 5 wt %-15 wt % of PVDF was dissolved in DMF. The polymer solution was loaded into an electrospinning system in which electrospinning of the polymer solution was performed under the following condition to form a polymer nanofiber membrane on a PET nonwoven fiber mat. For the electrospinning process, the working range of the applied voltage is 30-80 kv; the working range of the distance is 10-30 cm and the working range of the solution flow rate is 2-20 ml/h. The SEM image of the resultant PVDF nanofiber membrane is shown in FIGS. 3A-3B.

Example 3 Modified PVDF Nanofiber Membrane with Addition of PAN and LiCl

In another aspect of the invention, a PVDF nanofiber membrane was fabricated with a further modification of adding 0.1-1.0 wt. % PAN and 0.01-0.1 wt. % LiCl. The modified solution was electrospun at an applied voltage of 30-80 kv; a distance of 10-30 cm and solution flow rate of 2-20 ml/h. The SEM image of the modified PVDF nanofiber membrane with addition of PAN and LiCl is shown in FIGS. 4A-4B.

Example 4 Integration of an Antifouling Function by Introducing mPEG

By further introducing 1-5% of mPEG into the solution, methoxy-terminated PEG side chains were introduced in the nanofiber. An electrospinning process using the solution described above, with or without PAN and LiCl (with the addition of 1-5% mPEG), the working range of the applied voltage is 30-80 kv; the working range of the distance is 10-30 cm and the working range of the solution flow rate is 2-20 ml/h. The SEM image of an anti-fouling PVDF-PAN-mPEG nanofiber is shown in FIGS. 5A-5B; an anti-fouling test result is shown in Table 1.

TABLE 1

Comparison of Anti-fouling performance by the untreated and mPEG treated nanofiber membrane

| Bacteria inoculated | Untreated sample Logarithmic value of viable cell count (after 24-hour incubation) * | mPEG treated sample Logarithmic value of viable cell count (after 24-hour incubation) * | Antibacterial activity (R)# |
|---|---|---|---|
| Escherichia coli (ATCC 25922) | 3.39 | −0.204 | 3.595 |

Notes:
The value of antibacterial activity (R) must be equal to or greater than 2;
The inoculated count of Escherichia coli on the untreated sample was 2,400 CFU/cm$^2$.

Example 5 Water Contact Angle of PVDF-PAN-mPEG Antifouling Nanofiber

Figure 6A:
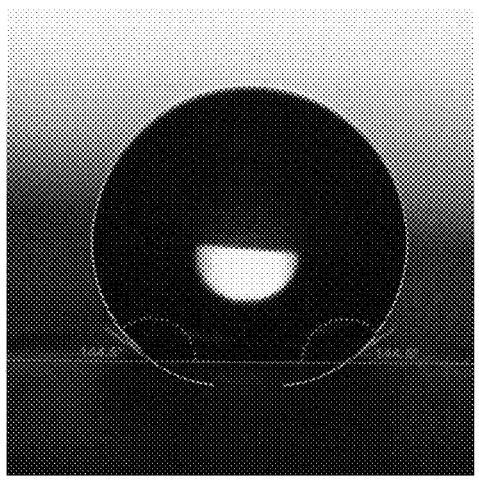
FIGS. 6A-B depict the water contact angle for the electrospun nanofibers of the water filtration system of FIG. 1.
Figure 6B:
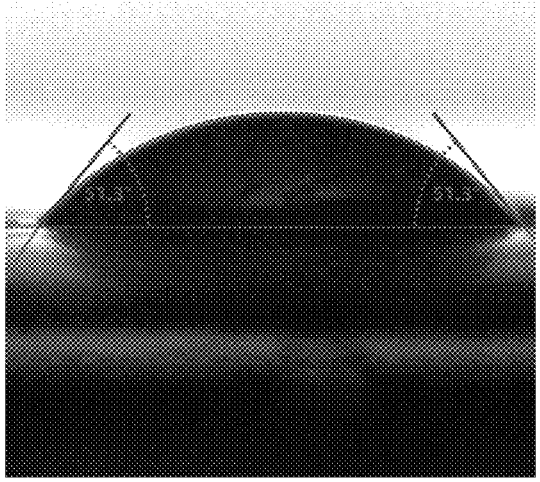

A PVDF-PAN-mPEG antifouling membrane was cut into 3×5 cm rectangular plate. The plate was amounted on the sample stage of contact angle goniometer. Water droplets were generated from a flat tip needle connected with a micrometer-controlled syringe. The volume of the water droplet is accurate to 1 μL. When the water droplet emerges, the sample stage is raised to adhere the water droplet to the membrane surface. The contact angle was measured through a CCD camera image programmed to determine the boundary of the water droplet and the fiber. The software imitates the outline of water droplet through the CCD camera image the droplet on the fiber to give the contact angle. The image of a water contact angle for a PVDF fiber is shown in FIG. 6A; the angle is 144.6 degrees. As seen in FIG. 6B, the contact angle for the PVDF-PAN-mPEG antifouling membrane was measured to be 51.3 degrees showing the enhanced wetting properties of the doped fiber.

Example 6 Water Purification by the Two-Stage Water Filter

The two cartridges are packed together as the water filter system of FIGS. 1A-1B in the sequence of adsorbent cartridge followed by membrane cartridge. The system of FIGS. 1A-1B is particularly suited for tap water filtration; the system may be place on the faucet itself or on the countertop or in under-sink placement and attachment to an outlet of a faucet.

Example 7 Removal Performance of the Two-Stage Water Filter at 2.5 L/Min

The system of Example 6 is provided using a first stage filter of a cartridge filled with mixture of silver-impregnated activated carbon, activated alumina, ceramic balls, chitosan and KDF 55, and a second stage membrane cartridge with PVDF-PAN-mPEG nanofiber membrane. Five liters of water containing different pollutants is filtered through the system. The flow rate of the system is set to 2.5 L/min by the pump supplying the water. The initial concentrations of the different pollutants in the water sample are listed in Table 2. The removal efficiency of filtering system at 2.5 L/min is shown in Table 3.

TABLE 2

Initial concentrations of various pollutants.

|  |  | Concentration (mg/L) |
| --- | --- | --- |
| Heavy Metal Removal | Lead | 0.15 |
|  | Cadmium | 1 |
|  | Arsenic | 0.05 |
|  | Barium | 10 |
|  | Chromium | 0.3 |
| Inorganic Removal | $NO_3^-$ as N | 27 |
|  | $F^-$ | 8 |
| Bacterial | E.Coli | $10^5$ CFU/L |

TABLE 3

Removal efficiency of the filtration system at 2.5 L/min.

|  |  | Removal efficiency |
| --- | --- | --- |
| Testing Capacity (L) |  | 5 |
| Flow Rate (L/min) |  | 2.5 |
| Heavy Metal Removal | Lead | >99% |
|  | Cadmium | 96% |
|  | Arsenic | >80% |
|  | Barium | >95% |
|  | Chromium | 92% |
| Inorganic Removal | Nitrate as $NO_3^-$ | 79% |
|  | $F^-$ | 86% |
| Bacterial | E. Coli | >99.99% |

The filtration system demonstrates excellent removal performance of heavy metals, inorganic pollutants and bacteria. The effluent concentrations achieved the level recommended by the WHO drinking water guidelines. The mixture of activated carbon, ceramic balls, activated alumina, chitosan and KDF55 can remove most heavy metals and around 80% of other inorganic pollutants. The mPEG-modified nanofiber membrane removed over 99.99% of E. Coli with no clogging or significant decrease of flow rate being observed during filtration.

Figure 7:
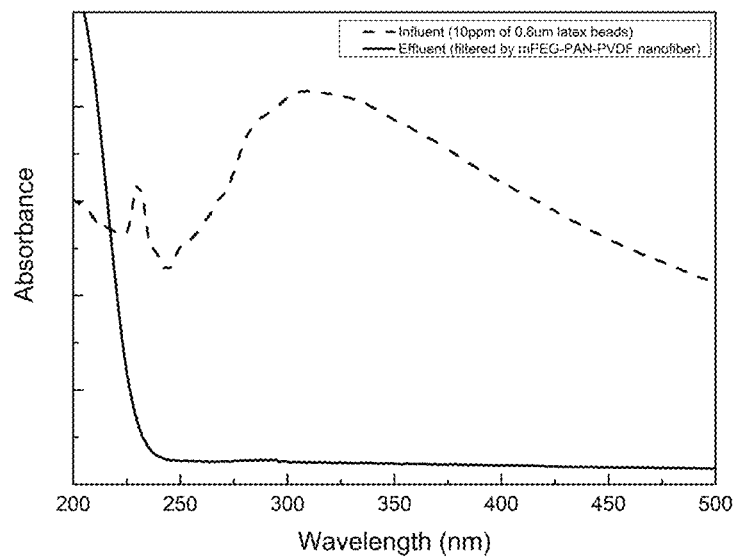
FIG. 7 is a plot a wavelength vs. absorbance for influent and filtered effluent demonstrating the filtration of particulates.

Example 8 Removal Performance of 0.6 μm Polystyrene Beads by the Water Filter at 2.5 L/Min Five liters of water including 10 ppm of 0.6 μm polystyrene beads were filtered by the filtration system to assess the capability of removing particulates. The turbid influent with the beads became clear following filtration using the system of FIGS. 1A-1B. The absorbance of 0.6 μm polystyrene beads is at 308 nm. UV-vis spectroscopy in FIG. 7 shows that more than 99% of the 0.6 μm polystyrene beads were filtered by the filtration system.

Example 9 Removal Capacity of the Filtering System, 6,000 L Challenging Water at 2.5 L/Min Flow Rate A total of 6,000 L of challenging water was filtered by the filtering system. The daily load of challenging influent is 400 L, it was prepared daily with a base of deionized water having the spiked concentrations listed in Table 4 below:

TABLE 4

Spiked concentration of influent

| Parameter | Influent Conc. |
| --- | --- |
| Lead | 0.15 mg/L |
| Chlorine | 2 mg/L |
| Estrone | 140 ng/L |

The filter system is conditioned with 100 L deionized water, total loading of 6,000 L influent (400 L per day) is applied to the filter at 2.5 L/min (~30 psi). Influent and effluent samples were taken at 25% ($1500^{th}$ L), 50% ($3000^{th}$ L), 75% ($4500^{th}$ L) and 100% ($6,000^{th}$ L) loading. The filter system can effectively remove the pollutants in Table 3 for 6,000 L, the results of the removal efficiency are shown in Table 5.

TABLE 5

Removal efficiency of the water filter for 6,000 L challenging water at 2.5 L/min

|  |  | 1500 L | | | 3000 L | | | 4500 L | | | 6,000 L | | |
| --- | --- | --- | --- | --- | --- | --- | --- | --- | --- | --- | --- | --- | --- |
| Analyte | Spiked Influent Conc. | 25% Loading Before | 25% Loading After | % Removal | 50% Loading Before | 50% Loading After | % Removal | 75% Loading Before | 75% Loading After | % Removal | 100% Loading Before | 100% Loading After | % Removal |
| Lead, ug/L | 150 | 127.2 | 3.9 | 97 | 121.2 | 3.3 | 97 | 142.5 | 3 | 98 | 135.5 | 2.4 | 98 |
| Chlorine, mg/L | 2 | 2.2 | <0.1 | >95 | 2.2 | <0.1 | >95 | 2.2 | <0.1 | >95 | 2.1 | <0.1 | >95 |
| Estrone, ng/L | 140 | 150 | <10 | >90 | 130 | <10 | >90 | 140 | <10 | >90 | 130 | <10 | >90 |

Figure 8:
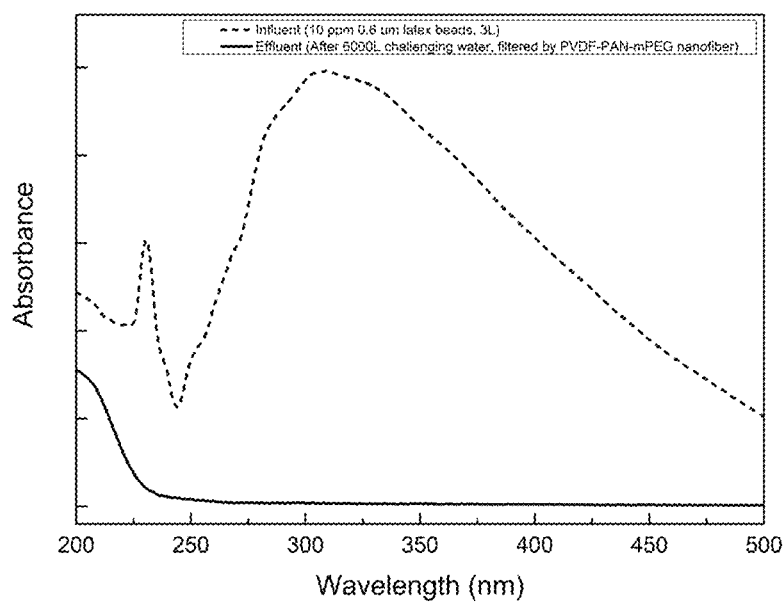
FIG. 8 is a plot of wavelength vs. absorbance for influent and filtered effluent demonstrating the filtration of particulates.

Example 10 Removal Performance of 0.6 μm Polystyrene Beads of the Water Filter at 2.5 L/Min after 6,000 L Filtration of Challenging Water After filtering 6,000 L of challenging water with contaminants, the filtration system was further tested for the removal performance of 0.6 μm polystyrene beads. The filtering system was conditioned with 50 L DI water; 10 L water containing 10 ppm of 0.6 μm polystyrene beads was then pumped through the filtering system. More than 99% of beads were removed by the filtering system; the UV-vis spectra demonstrating the removal are shown in FIG. 8.

Figure 10:
FIG. 10 depicts a mobile phone display of an application showing the readings of the TDS sensor of FIG. 9.

Example 11 Water Quality and Use of the Water Filter Monitored by Mobile Application The water filter is equipped with a TDS sensor and total volume counter and is connected via WI-FI to mobile phone to permit users to monitor the water quality and the use of water through a mobile application. Two TDS sensors, as seen in FIG. 9, show the dissolved solids content at the input and the output of the filtration system. The volume of daily use and total use of water filtered by the filtration system is displayed in the mobile application. Notifications are sent to the user's mobile phone when the filter cartridges need to be changed; a mobile phone display using the mobile application is depicted in FIG. 10.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A multiple stage water filtration system for purifying tap water, the water filtration system comprising:
    a first adsorbent stage cartridge including filtering media comprising approximately 40-65 wt. % of silver-impregnated activated carbon, approximately 1-10 wt. % of activated alumina, approximately 15-35 wt. % of ceramic balls, approximately 0.5-1 wt. % of chitosan and approximately 0.5-1 wt. % of kinetic degradation fluxion media that includes zinc and brass;
    a second filtration stage cartridge including an antifouling electrospun nanofiber membrane, the antifouling electrospun nanofibers having a diameter from approximately 100 nanometers to 1 micron wherein the antifouling electrospun nanofiber membrane comprises a polyvinylidene fluoride base material, the base material being doped with polyacrylonitrile and including bacteria-repellent methoxy polyethylene glycol side chains such that the antifouling electrospun nanofiber membrane has a water contact angle of approximately 55 degrees or less;
    a flow path provided between the first adsorbent stage cartridge and the second filtration stage cartridge;
    the multiple stage water filtration system being capable of filtering water at a volume rate of at least approximately 2 liters per minute.

2. The water filtration system of claim 1, wherein a water filtration pathway is from the first adsorbent stage cartridge to the second filtration stage cartridge.

3. The water filtration system of claim 1, wherein the antifouling electrospun nanofiber membrane is produced by electrospinning a solution of 5-15 wt. % of polyvinylidene fluoride, 0.1-1.0 wt. % of polyacrylonitrile, and 0.01-0.1 wt. % of lithium chloride (LiCl) in a dimethylformamide (DMF) solvent.

4. The water filtration system of claim 1, wherein the first adsorbent stage cartridge and second filtration stage cartridge are configured to remove heavy metals, inorganic pollutants, the bacteria and particulates.

5. The water filtration system of claim 4, wherein said heavy metals comprise one or more of cadmium, chromium, lead, barium, or arsenic.

6. The water filtration system of claim 4, wherein said inorganic pollutants comprise nitrates and fluorides.

7. The water filtration system of claim 4, wherein said bacteria comprise *E. coli*.

8. The water filtration system of claim 1, wherein the water filtration system capacity is at least 6,000 liters.

9. The water filtration system of claim 1, wherein the water filtration system is configured to remove water impurities up to 99.99%.

10. The water filtration system of claim 1, further comprising one or more total dissolved solids sensors.

11. The water filtration system of claim 10, wherein a first total dissolved solids sensor is positioned to measure the total dissolved solids at a water inlet and a second total dissolved solids sensor is positioned to measure the total dissolved solids at a water outlet.

12. The water filtration system of claim 10, wherein the one or more total dissolved solids sensors communicates total dissolved solids information to an external computing device.

13. The water filtration system of claim 12, wherein the external computing device is a mobile phone.

14. The water filtration system of claim 13, wherein the mobile phone includes a computer program that displays the total dissolved solids content and notifies a user when it is time to change a water filtration system cartridge.

15. The water filtration system of claim 1, wherein the antifouling electrospun nanofibers have a diameter from 200-600 nm.

* * * * *